United States Patent [19]
Shealy et al.

[11] Patent Number: 5,219,585
[45] Date of Patent: Jun. 15, 1993

[54] MONOMER EXHAUST SYSTEM

[75] Inventors: Dennis G. Shealy, Arden; Eugene T. Stamey, Candler, both of N.C.

[73] Assignee: BASF Corporation, Parsippany, N.J.

[21] Appl. No.: 852,899

[22] Filed: Mar. 18, 1992

Related U.S. Application Data

[63] Continuation of Ser. No. 484,586, Feb. 23, 1990, abandoned.

[51] Int. Cl.$^5$ ............................................. A21C 5/08
[52] U.S. Cl. ......................................... 425/182; 55/84; 264/169; 425/72.2; 425/210; 425/255
[58] Field of Search .............. 55/84; 65/5; 264/176.1, 264/169, 211.14; 425/72.2, 66, 404, 464, 182, 210, 255

[56] References Cited

U.S. PATENT DOCUMENTS

| | | | |
|---|---|---|---|
| 2,019,609 | 11/1935 | Kinsella et al. | 425/72.2 |
| 3,444,587 | 5/1969 | Polovets et al. | 425/72.2 |
| 3,502,757 | 3/1970 | Spender | 264/169 |
| 3,982,915 | 9/1976 | Coggin, Jr. | 264/169 |
| 4,033,742 | 7/1977 | Nichols et al. | 264/169 |
| 4,038,354 | 7/1977 | Remmington et al. | 264/216 |
| 4,146,378 | 3/1979 | Levecque et al. | 65/5 |
| 4,204,828 | 5/1980 | Peckinpaugh et al. | 425/72.2 |
| 4,230,471 | 10/1980 | Levecque et al. | 65/5 |
| 4,424,927 | 1/1984 | Cardell | 425/72.2 |
| 4,436,683 | 3/1984 | Koschinek et al. | 264/237 |

FOREIGN PATENT DOCUMENTS

| | | | |
|---|---|---|---|
| 611858 | 4/1935 | Fed. Rep. of Germany | 425/72.2 |
| 153708 | 1/1982 | German Democratic Rep. | 264/169 |
| 40-25172 | 11/1965 | Japan | 264/176.1 |
| 44-21169 | 9/1969 | Japan | 264/176.1 |
| 48-28966 | 9/1973 | Japan | 264/169 |
| 52-8116 | 1/1977 | Japan | 264/169 |
| 52-34016 | 3/1977 | Japan | 264/169 |
| 89/03903 | 5/1989 | PCT Int'l Appl. | 425/72.2 |
| 179874 | 11/1966 | U.S.S.R. | 264/176.1 |
| 1413939 | 11/1975 | United Kingdom | |

*Primary Examiner*—David A. Simmons
*Assistant Examiner*—William J. Matney, Jr.

[57] ABSTRACT

An exhaust system for exhausting fumes released from a melt spinning process has a housing defining an exhaust system, a nozzle assembly extending partially from the housing toward the fume source with a nozzle tip disposed sufficiently close to the fume source to collect the fumes, a duct in communication with the exhaust chamber and having an outlet for exhausting the fumes, a driving force moving the fumes through the system from the nozzle to the outlet, and a method for automatically purging the exhaust system of condensed fume deposits.

14 Claims, 4 Drawing Sheets

MONOMER EXHAUST SYSTEM

This is a continuation of copending application Ser. No. 07/484,586 filed on Feb. 23, 1990 now abandoned.

BACKGROUND OF THE INVENTION

This invention relates generally to apparatus for melt spinning polymeric materials. More specifically, this invention relates to apparatus for exhausting fumes from spinnerets used in melt spinning.

In the melt spinning of some polymers, it is well known that unreacted reactants and volatile side products are released from the product stream. Certain polyamides are prone to release unreacted monomers. In the case of Nylon 6, the polymeric product releases ε-caprolactam during melt spinning. Common sites for release are places where the in-process polymer stream is exposed to an extracting atmosphere. One such location is the spinneret.

Typically, about ten percent (10%) of ε-caprolactam monomer remains unreacted in the production of Nylon 6. Although nylon chips are ordinarily washed prior to melt spinning, about one to two percent of unreacted monomer remains unextracted. Epsilon caprolactam is a relatively expensive raw material. Furthermore, the presence of unreacted ε-caprolactam is known to cause difficulties in processing the polymer. Removing released monomer simultaneously with processing can greatly increase productivity. For instance, the more unreacted monomer removed during the melt spinning process itself, the less handling that is required to remove monomer prior to melt spinning. It is therefore for reasons of efficiency, as well as economy, that monomers are separated from the polymer in process.

Since the spinneret is a major site of monomer release, monomer fumes are advantageously collected there. In a standard process, molten extruded polymer exits the spinneret and enters a quench cabinet designed to solidify the polymer. U.S. Pat. No. 4,436,688 to Koschinek et al. shows an arrangement of a quench cabinet and spinneret. An airstream transverse to the processing filaments is exhausted near the spinneret to a hood for removal of vaporized polymer extract.

The quench cabinet and its surroundings are cooler than the incoming polymer and unreacted monomer vapor. The exhaust hood is also cooler. Monomer fumes condense on cool surfaces. Therefore, all known exhaust systems work intermittently depending on cleanliness.

In general, the closer the exhaust hood inlet is to the spinneret, the more effectively the hood removes the vaporized polymer extract. On the other hand, a spinneret must remain accessible for maintenance, observation or other reasons. It is, therefore, undesirable that an exhaust system interfere with spinneret access. In known designs this fact has limited the distance of the hood inlet from the spinneret.

What remains needed is a monomer exhaust system which operates continuously. For improved efficiency, a further need is a monomer exhaust system which removes vaporized polymer extract as close to the initial extraction point as possible.

SUMMARY OF THE INVENTION

Accordingly, the present invention provides an exhaust system for exhausting fumes released from a melt spinning process wherein a portion of the exhausted fumes condense on the system. The exhaust system includes a housing defining an exhaust chamber, a telescoping nozzle assembly extending partially from the housing toward the fume source and having a tip disposed sufficiently close to the fume source to collect the fumes and telescoping in sliding, overlapping sections, a duct in communication with the exhaust chamber and having an outlet for exhausting the fumes, a driving force moving said fumes through said system from said nozzle to said outlet, and a mechanism for automatically purging said exhaust system of condensed fume deposits.

It is an object of the present invention to provide an improved quench cabinet exhaust system.

It is another object of the present invention to provide an improved nozzle for a quench cabinet exhaust system.

From the description of the presently preferred embodiments which follows, further objects and advantages will become apparent to those who are ordinarily skilled in the relevant art.

BRIEF DESCRIPTION OF THE PREFERRED EMBODIMENTS

Figure 1:
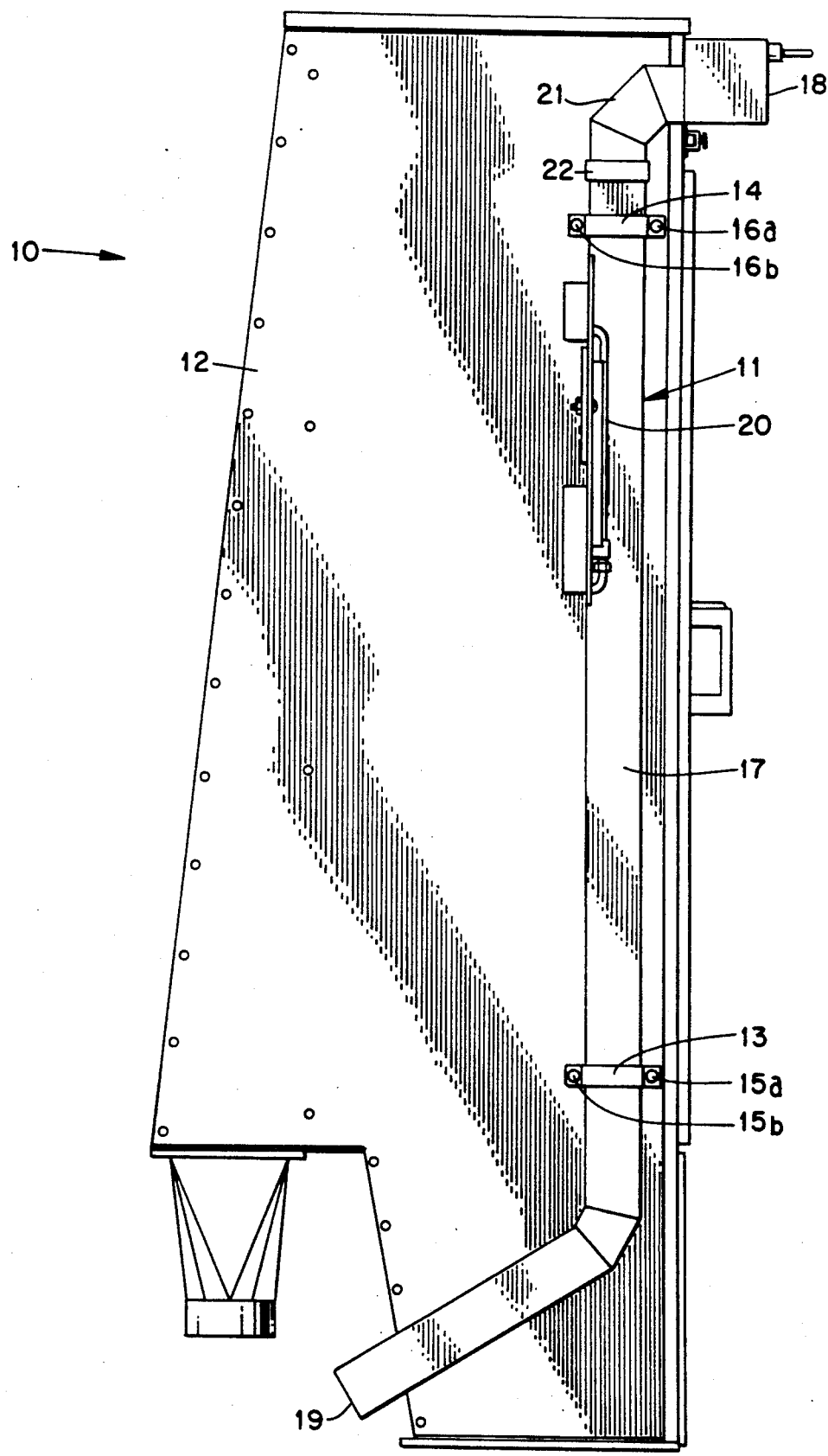
FIG. 1 is a side elevational view of a monomer exhaust system according to the present invention and mounted on a quench cabinet.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 is a side elevational view of one side of quench cabinet 10 with the monomer exhaust system of the present invention in place. Monomer exhaust system 11 is mounted to side 12 of quench cabinet 10. For this purpose, ordinary mounting bands 13 and 14 may be used. Suitable screws 15a, 15b, 16a and 16b with lock washers may fasten mounting bands 13 and 14 to side 12 of quench cabinet 10. Exhaust duct 17 extends substantially along side 12. Other arrangements of ducting are contemplated through any reasonable course as would be apparent to one ordinarily skilled in the relevant art. Monomer exhaust pickup housing 18 extends anteriorly adjacent quench cabinet 10. Duct exit 19 is disposed approximately vertically opposite exhaust pickup housing 18, an arrangement that facilitates gravitational flow of condensates and rinse solutions. Elbow 21 connects housing 18 with duct 17. Connector 22 mates elbow 21 with duct 17. In one preferred arrangement, elbow 21 is welded or otherwise attached to housing 18. For completeness, manometer 20 is shown mounted in an optional relative arrangement on quench cabinet side 12. Manometer 20 is not, however, functionally related to or necessary to exhaust system 11.

Figure 2:
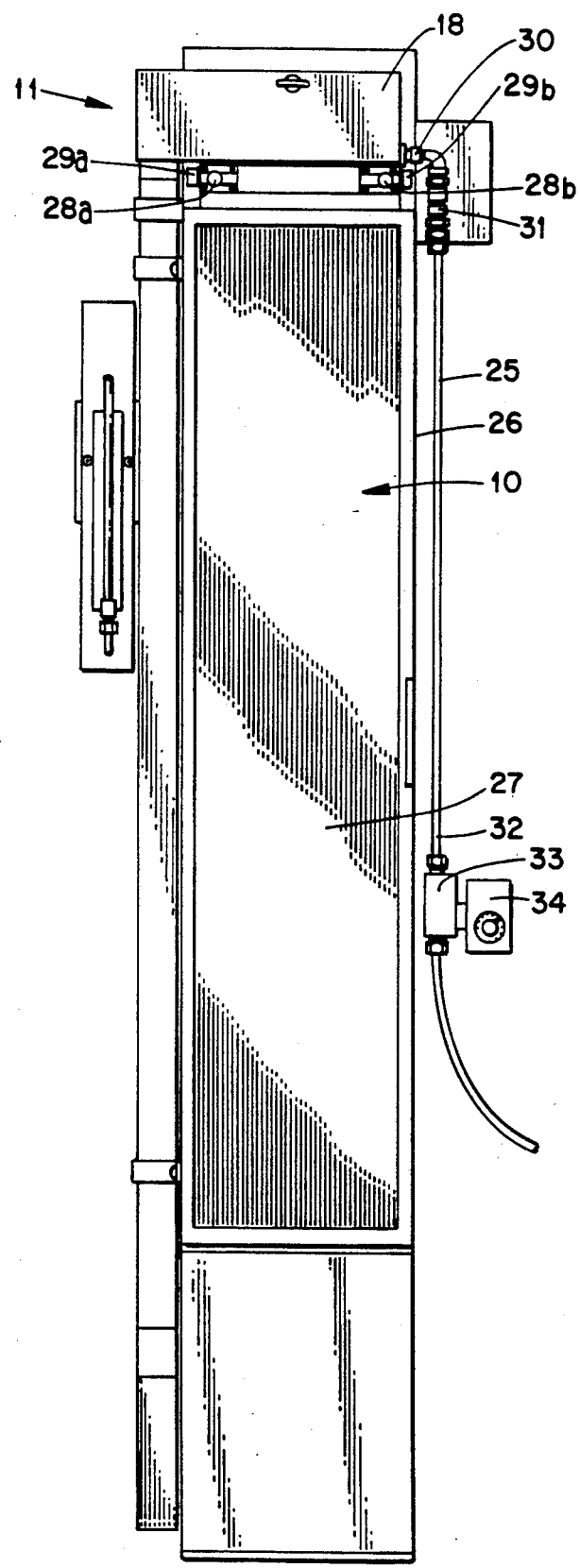
FIG. 2 is a front elevational view of the exhaust system and quench cabinet of FIG. 1.

FIG. 2 is a front elevational view of quench cabinet 10 with exhaust system 11 mounted thereon. Spray assembly 25 is shown disposed on quench cabinet side 26. Although duct 17 and spray assembly 25 are shown mounted on opposite sides of the quench cabinet, other arrangements of the duct relative to the spray assembly are contemplated. Exhaust pickup housing 18 is mounted to quench cabinet face 27. For this purpose, sliding latches 28a, 28b and mating strikers 29a and 29b may be used. Latches 28 are fastened to the exhaust system while strikers 29 are fastened to the quench cabinet face. Suitable sliding latches and strikers, perhaps having brazer soft aluminum rivets as hardware, are available from Southco Company. As will be discussed in more detail below, the use of latches enables easy removal of the housing. In addition, cabinet face 27 may include a door providing access to the inside of the cabinet. This door operates independently of the present exhaust system. Spray assembly 25 includes spray nozzle 30 which enters the side of exhaust pickup housing in fluid flow communication therewith. Quick connect-type connector 31 connects nozzle 30 with tubing 32. A useful quick connect stem and body comprising connectors 31 are available from Swagelok. Tubing 32 may be, for example, Paraflex tubing having appropriate outer and inner diameters. The tubing is connected at its end opposite nozzle 30 to a fluid supply (not shown). For most applications this fluid is water. A valve 33 is located at some point along the fluid supply system. The valve is preferably controlled by timer 34.

Figure 3:
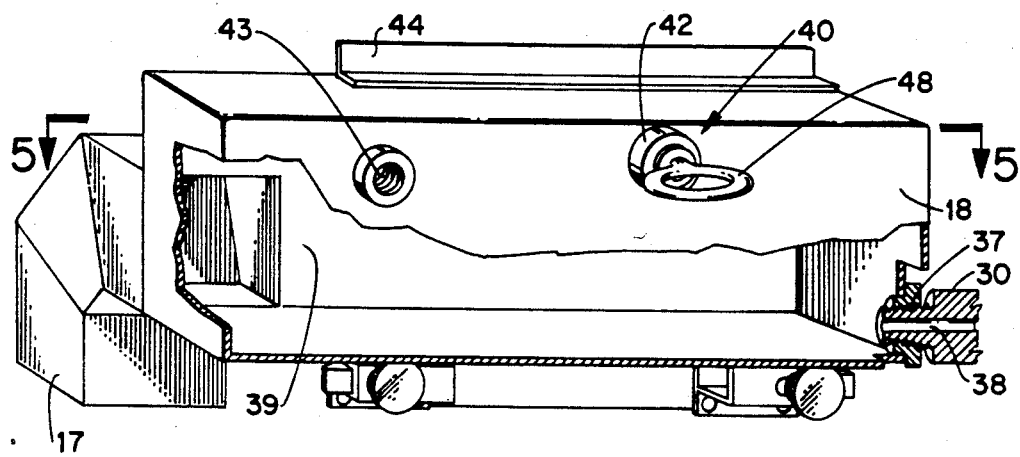
FIG. 3 is a front perspective view in partial cross-section of the exhaust hood housing of the present invention.

FIG. 3 is a front perspective view showing exhaust hood housing 18 in greater detail. The view is a partial cross-section showing pipe tap 37 which is threaded along its inner diameter to threadingly receive externally threaded spray nozzle 30 having orifice 38. Orifice 38 is of a diameter sufficiently small to cause water flowing therethrough to spray upon exit. A useful spray nozzle is a Spraying Systems ⅛ inch GD 3.5 nozzle. Exhaust duct 17 opens into housing 18 through rear wall 39 thereof. Plunger assembly 40 includes plunger rod 41 and plunger stop 42. Pressure checking access 43, although not essential for operation of the present invention, is optionally provided in a convenient location. L-shaped bracket 44 present on the top of housing 18 provides a sealing surface between the exhaust pickup and the quench cabinet.

Figure 4:
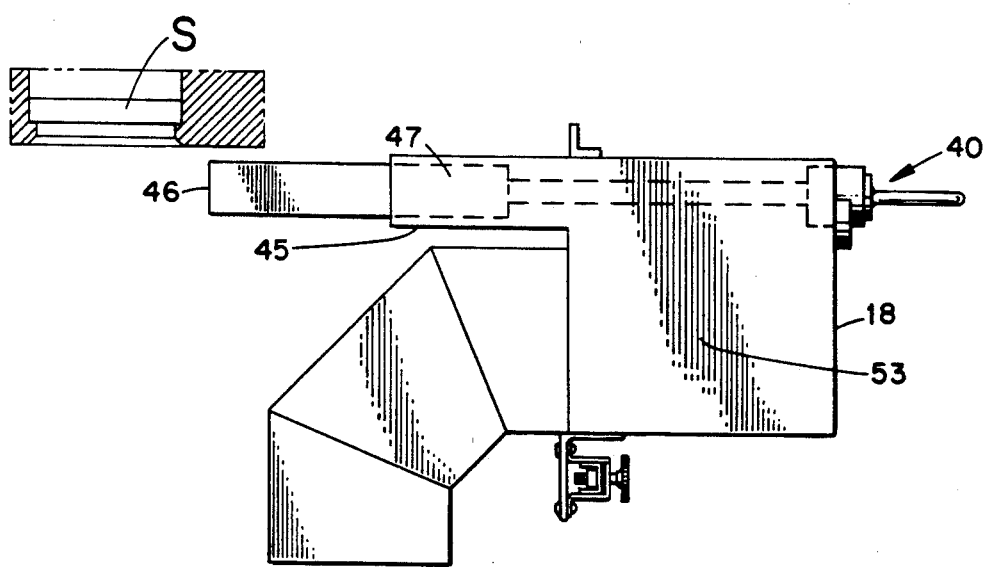
FIG. 4 is a side elevation of the housing of FIG. 3 with a plunger assembly shown in phantom and in a first position.

FIG. 4 is a side elevational view of the present invention with the plunger assembly seen in phantom. Pickup nozzle 45 is fully extended. At this point nozzle tip 46 is closest to the source of extracted fumes S, here a spinneret. Pickup nozzle 45 is slidably mounted within rearwardly extending projection 47 of exhaust pickup housing 18. Nozzle 45 communicates with exhaust chamber 53 defined by housing 18.

Figure 5:
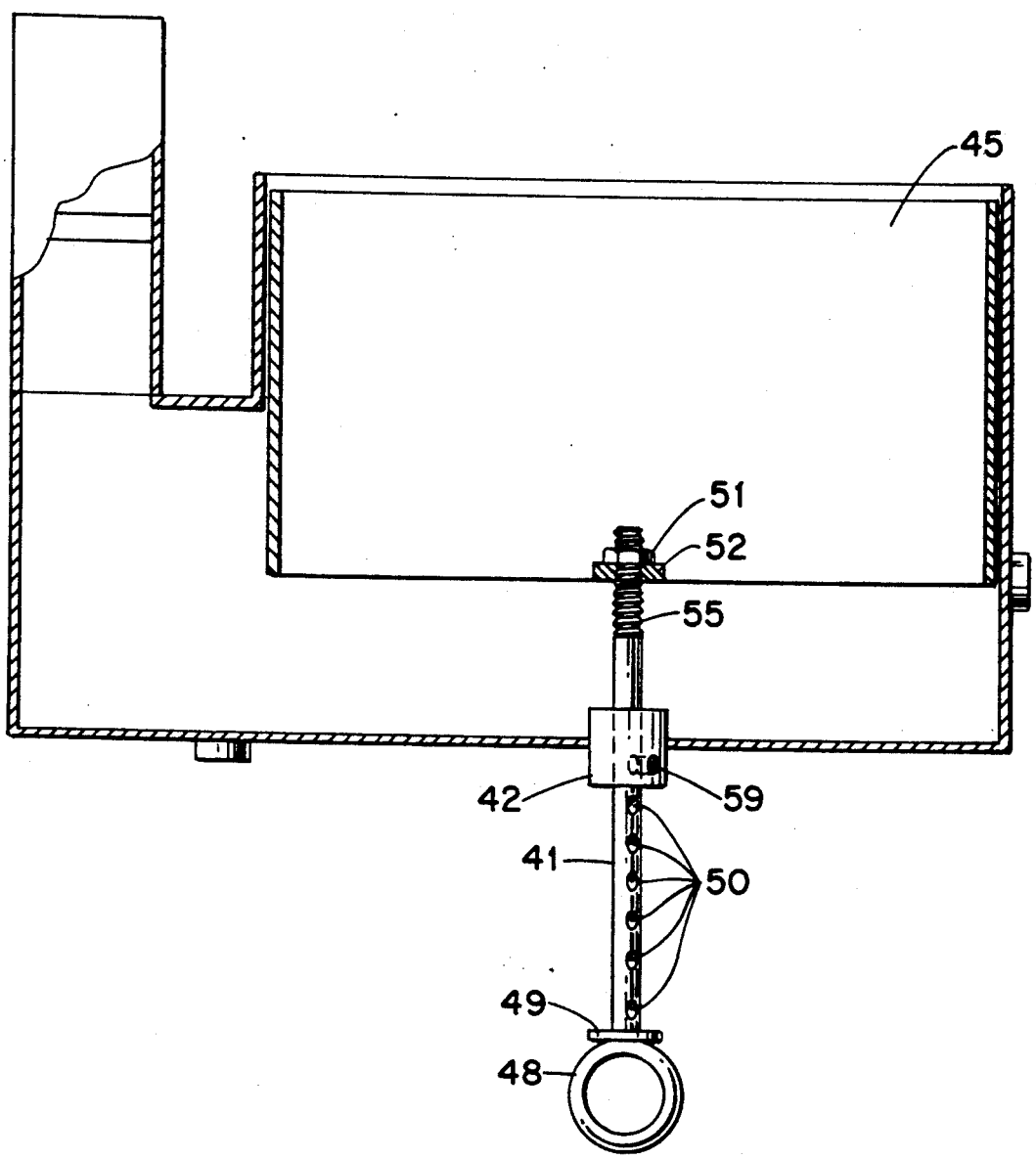
FIG. 5 is a cross-sectional view of the housing of FIG. with the plunger assembly in a second position and taken along line 5—5, looking in the direction of the arrows.

FIG. 5 is a cross-sectional view of the exhaust pickup system of the present invention. Pickup nozzle 45 is fully retracted into projection 47. Plunger rod 41 has ring 48 disposed externally of housing 18. Ring 48 may be used as a grasping handle. Plunger rod 41 enters housing 18 through plunger stop 42 which is drilled to an appropriate diameter slightly larger than plunger rod 41. Plunger rod 41 is slideably received through plunger stop 42. Plunger rod 41 is further provided with mating stop 49 which matingly engages plunger stop 42 to prevent further rearward movement of the plunger and pickup nozzle 45 which is attached thereto, thus defining the maximum extended position (see FIG. 4). Plunger rod 41 has holes 50. In addition, plunger stop 42 is provided with hole 59 for receiving a detent plunger (not shown). Hole 59 aligns with holes 50 while the detent plunger traverses 59 lengthwise to matingly engage in a selected hole 50. This arrangement allows nozzle 45 to be adjusted to and then set in various degrees of retraction. At its most rearward end, plunger rod 41 is threaded 55 for receiving correspondingly threaded jam nut 51. Jam nut 51 solidly meets bar 52. Bar 52 forms a partial end wall of nozzle 45 and has a hole therethrough for receiving plunger rod 41. Preferably this hole is threaded about its diameter. Other than bar 52, nozzle 45 is substantially hollow, having four substantially solid sides and is shown having a rectangular shape.

Figure 6:
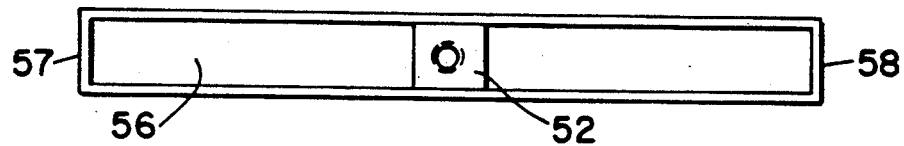
FIG. 6 is a front elevational view of a pickup nozzle according to the present invention.

FIG. 6 is a front elevational view of nozzle 45. Bar 52 is shown disposed approximately midway between sides 57 and 58 of nozzle 45. In this manner, the size of passageway 56 can be maximized while still providing a mating surface for plunger rod 41. (See FIG. 5)

For construction, one-eighth inch aluminum may be used for most of the parts of the present invention, although certain parts might be advantageously made from stainless steel. For example, plunger rod can be made from stainless steel. Certain other parts such as the fluid supply parts might preferably be made from brass, copper, or synthetic materials but the choice of materials is readily within the knowledge of the ordinary artisan. The metal portions of the present invention which are not designed to be movably or removably joined are beneficially of burr-free welded construction. Nozzle 45 may be provided with a coating on the exterior surface thereof to decrease friction between its exterior surface and the interior surface of exhaust pickup housing 18. This material may be 0.06 inch to 0.08 inch thick nylon, for example. It is contemplated that other friction reducing coating materials might be used and it may be desired to adjust the coating material to correspond to the polymerization process in which the present invention is installed.

As noted, the position of nozzle 45 is adjustable. To accomplish this the user simply grasps ring 48. Ring 48 is moved toward the user to retract nozzle 45 and away from the user to extend the nozzle. The desired position is fixed by engagement of the detent plunger within a hole 50. For access to the spinneret, nozzle 45 is retracted according to the above procedure. It is contemplated that similar parts may be used instead of a detent plunger. An example of such a part is a set screw.

As a further advantage of the present invention, it was surprisingly discovered that the adjustable nozzle allows for an adjustable modification ratio. In other words, the distance of nozzle 45 from spinneret S determines, to some degree, the cross-section of the filament produced. Cross-sections ranging from nearly or perfectly round to highly lobed can be achieved by retracting and extending the nozzle, respectively. Varying degrees of modification result from adjustment intermediate extension and retraction. Although it is not desired to be limited by theory, it is believed that the faster cooling of the filament that results when nozzle 45 is in its extended position causes the increased modification ratio.

In operation the nozzle 45 extends toward the fume emitting source, in the present case monomer exhaust from the spinneret in a polyamide process. Quench gas, most typically chilled air, is drawn through quench cabinet 10 by some driving force. This driving force may be a suction fan located near duct exit 19 (FIG. 1). The quenching air is warmed to a degree by and mixes with fumes emitted from the extruded polymer. The air-fume mixture enters exhaust system 11 through nozzle tip 46 and is drawn into the chamber 53 of exhaust pickup housing 18. The driving force which is at work, or suction fan, drives the exhaust fume air mixture into the duct to a suitable waste collection area for recycling or disposal.

Because the housing of the quench cabinet and monomer exhaust system is commonly cooler than the entering air, monomer fumes tend to condense thereon and when dried create obstructions and problems with the efficiency of exhaust fume removal and quenching. To avoid heavy buildup and periodically purge the system to free it of excess monomer deposits, the internal surfaces of exhaust system are periodically rinsed with wash fluid. The period between washings may be determined by an automatic timer (FIG. 2) which is located somewhere along the fluid supply system. A suitable timer for this purpose is supplied by Tork and commonly accompanies a solenoid valve but other valves and timers may also be used.

In the case of Nylon 6 production the $\epsilon$-caprolactam monomer is water soluble so the rinse fluid is water which may be purified water if the collected waste monomer is intended for recycling or may be tap water or the like if it is intended for disposal. The water jet, in the case of Nylon 6 polymerization, dissolves the monomer from the internal surfaces of the exhaust system upon which it has collected and the water and dissolved monomer then are exhausted through exhaust duct 17 (FIG. 1). Of course other wash solvents may be used depending upon the solubility of the condensate to be rinsed.

It will be understood that the present invention is useful with a variety of processes and components. With appropriate modifications, if any are needed, it can be adapted for use with other polymers, processes, systems, etc.

An additional feature of the present invention is the ease at which it may be removed for servicing and the like. Quick connector 31 is simply disconnected and sliding latches 28a and 28b are released from strikers 29a and b (FIG. 1). Exhaust duct 17 can remain stationary on quench cabinet 10 while elbow 21 releases from connect or 22 (FIG. 1). The entire housing is then drawn forward and removed from quench cabinet 10.

While the invention has been illustrated and described in detail in the drawings and foregoing description, the same is considered as illustrative and not restrictive in nature. It should be understood that only the presently preferred embodiment has been shown and described and that all changes and modifications that come within the spirit of the invention are desired to be protected.

What is claimed is:

1. An exhaust system for exhausting fumes released from a melt spinning process wherein a portion of the exhausted fumes condense on said system comprising:

a housing defining an exhaust chamber;

a telescoping nozzle assembly extending partially from said housing toward the fume source, said nozzle having a tip disposed sufficiently close to the fume source to collect the fumes and telescoping in sliding, overlapping sections within said chamber while said housing remains stationary relative to said telescoping nozzle;

a duct in communication with said exhaust chamber and having an outlet for exhausting the fumes;

a driving force moving the fumes through said system from said nozzle to said outlet; and rinsing means for automatically purging said exhaust system of condensed fume deposits.

2. The exhaust system of claim 1 and further comprising an external retraction control communicating with said nozzle.

3. The exhaust system of claim 2 wherein said external control has adjusting means for adjusting said nozzle in various degrees of retraction.

4. The exhaust system of claim 1 wherein said rinsing means includes a second nozzle for spraying a fluid inside said housing, said second nozzle being in fluid flow communication with a continuous source of fluid; and a timed valve for timing fluid spray from said nozzle.

5. In an exhaust system for exhausting waste fumes from a melt spinning process, a pick-up nozzle comprising:

a nozzle body in fume exhaust communication with an exhaust system housing; and retracting means for telescoping said nozzle away in sliding, overlapping sections from the fumes and into a stationary housing.

6. The nozzle of claim 5 wherein said retracting means includes a plunger, said plunger extending at one end external of said housing and at a second end attaching to said nozzle.

7. The nozzle of claim 6 wherein said plunger includes a grasping handle at the external end.

8. The nozzle of claim 6 wherein said retracting means further includes adjusting means for adjusting the distance of said nozzle from the fumes.

9. In an exhaust system for exhausting waste fumes from a melt spinning process, a pick-up nozzle comprising:

a nozzle body in fume exhaust communication with an exhaust system housing; and retracting means for telescoping said nozzle away from the fumes and into a stationary housing, said retracting means including a plunger, said plunger extending at one end external of said housing and at a second end attaching to said nozzle, and further including adjusting means for adjusting the distance of said nozzle from the fumes, said adjusting means including a series of bores on said plunger and a detect plunger aligned to engage said bores.

10. The nozzle of claim 9 wherein said exhaust system includes a second nozzle for spraying water into said system and rinsing monomer deposits thereby.

11. An exhaust system for removing unreacted monomer released at a spinneret in an $\epsilon$-caprolactam melt spinning process comprising:

a housing defining a chamber;

a laterally elongate telescoping nozzle in fluid flow communication with said chamber; said nozzle telescoping in sliding, overlapping sections into said housing and away from spinneret while said housing remains stationary relative to said telescoping nozzle;

a sprayer for rinsing said chamber with water;

a valve controlling spray emission from said sprayer; and an outlet for emitting the exhausted fumes and water.

12. The exhaust system of claim 11 wherein said valve is times to be automatically open at periodic intervals.

13. The exhaust system of claim 11 wherein said housing is mounted on a quench cabinet.

14. The exhaust system of claim 13 wherein said housing is removable from said quench cabinet.

* * * * *